(12) United States Patent
Del Toso et al.

(10) Patent No.: US 7,519,109 B2
(45) Date of Patent: Apr. 14, 2009

(54) PROCESS FOR CONFIGURING AN XDSL MODEM AND XDSL MODEM HAVING SUCH A PROCESS

(75) Inventors: Christophe Del Toso, Claix (FR); Chan-Virak Trang, St-Ismier (FR)

(73) Assignee: STMicroelectronics S.A., Montrouge (FR)

( * ) Notice: Subject to any disclaimer, the term of this patent is extended or adjusted under 35 U.S.C. 154(b) by 745 days.

(21) Appl. No.: 10/813,991

(22) Filed: Mar. 31, 2004

(65) Prior Publication Data
US 2004/0196912 A1 Oct. 7, 2004

(30) Foreign Application Priority Data
Apr. 1, 2003 (FR) .................. 03 04047

(51) Int. Cl.
H04B 1/38 (2006.01)
(52) U.S. Cl. ........................................ 375/222
(58) Field of Classification Search ............. 375/222, 375/220, 256, 257; 725/111; 379/93.01, 379/27
See application file for complete search history.

(56) References Cited

U.S. PATENT DOCUMENTS

| | | | |
|---|---|---|---|
| 6,763,097 B1 * | 7/2004 | Vitenberg | 379/93.31 |
| 6,865,232 B1 * | 3/2005 | Isaksson et al. | 375/260 |
| 7,224,672 B2 * | 5/2007 | Arai | 370/252 |
| 2002/0041572 A1 * | 4/2002 | Palm | 370/278 |
| 2003/0051060 A1 * | 3/2003 | Vitenberg | 709/250 |
| 2004/0184520 A1 * | 9/2004 | Palm | 375/222 |

FOREIGN PATENT DOCUMENTS

WO WO 99/50967 10/1999

OTHER PUBLICATIONS

Wiese, B. et al., "Programmable Implementations of xDSL Transceiver Systems," *IEEE Communications Magazine* 38(5):114-118, May 2000.

* cited by examiner

*Primary Examiner*—Khai Tran
(74) *Attorney, Agent, or Firm*—Lisa K. Jorgenson; Robert Iannucci; Seed IP Law Group PLLC

(57) ABSTRACT

Process for configuring an xDSL-type symmetric modem, comprising the following: detecting a predetermined criterion corresponding to an asymmetric operating mode, in particular an ADSL-type; and in response to said detection, disabling a number of carriers in order to establish an asymmetric operating mode. More specifically, the modem is VDSL-type, operating with up to 4096 carriers and being reconfigurable in ADSL mode with a number of carriers reduced to 256. In one case, said criterion is the detection of signals as defined in recommendation G.994.1 of the International Telecommunications Union of (ITU). Alternatively, mode switching could be controlled based on measurement of the size of the line.

30 Claims, 13 Drawing Sheets

PROCESS FOR CONFIGURING AN XDSL MODEM AND XDSL MODEM HAVING SUCH A PROCESS

BACKGROUND OF THE INVENTION

1. Field of the Invention

The present disclosure relates generally to the field of telecommunications, and more particularly but not exclusively to a process for configuring a VDSL-type modem allowing several types of operation and such a modem.

2. Description of the Related Art

New telecommunications applications require a fast access to the Internet network and high communication rates.

DSL-type (Digital Subscriber Line) techniques have been developed and in particular the very first one, commonly known as ADSL (Asynchronous Digital Subscriber Line) that spreads on the network. This technique allows rates of about 5 Mbits/s on distances up to about 5 km.

Other more promising techniques will provide higher rates. It is the case of the VDSL (Very high speed Digital Subscriber Line) techniques, currently awaiting definition by standardization authorities, and which will allow asymmetric and symmetric communications reaching rates of about 50 Mbits/sec., but on quite shorter distances (about 1 to 2 km).

FIG. 1 illustrates the situation of the various xDSL-type techniques—some of which are still currently being defined by standardization authorities, in particular the ITU (International Telecommunications Union), the ANSI and the IEEE.

As can be seen in FIG. 1, while techniques of the ADSL-type (and its derived techniques ADSL2 and ADSL2+) make it possible to generalize a fast access on distances up to 5 km, highest rates are only possible with the VDSL technique that will, however, allow such rates only up to a limited distance of 1.5 km.

For this reason, it is rather common to oppose ADSL to VDSL, regarding the former as a way to carry out broadband access to the Internet for the general public and reserving the latter to niche markets and in particular for broadband video transmit applications used by residential customers or professional users, such as video conferencing that consumes large amounts of symmetric stream.

Yet, such opposition is mere trickery and it seems logical that, in the long term, consumers (both the general public and professional users) will prefer the techniques with the highest performances when they become commercially available.

Due to the increased development of ADSL in networks, it is now clear that a situation of coexistence will arise that will last for some time. The consumers who will have chosen to invest in ADSL will not agree to change immediately their expensive ADSL modems for the newer and even more expensive VDSL modems. On the other side, telecommunications operators will probably only gradually change to VDSL modems the number of modems located in their optical network units.

Thus, both symmetric and asymmetric access techniques implemented by the ADSL and VDSL technologies will have to coexist for a long time, and such coexistence will cause certain problems for both consumers and telecommunications operators.

Indeed, consumers will have to consider which type of access (ADSL or VDSL) a telecommunications operator can provide in a given geographical place, and it is a possibility that both types will not systematically be available. And operators will have to deal with consumers'—quite legitimate—reluctance to renew a modem they have just installed.

Consequently, because of this coexistence of ADSL and VDSL techniques that is going to continue, it would be desirable to facilitate consumers' choice—professionals as well as the general public—by saving them from having to consider which type of access they can subscribe to. Regarding operators, it would also be desirable that they can manage with serenity the existing hardware in various optical network units in order to allow progressive change of hardware.

In addition to the coexistence of ADSL and VDSL modems as previously mentioned, it would further be desirable that users could benefit from the advantages of both the VDSL and the ADSL techniques by allowing a user to control his/her mode of communication with the network.

This would then result in multiple functions and new applications.

BRIEF SUMMARY OF THE INVENTION

One aspect of the present invention provides a process for configuring an xDSL-type modem allowing operation in asymmetric mode.

Another aspect of the invention comprises realizing a dual-mode DSL modem architecture that authorizes high-rate access in both ADSL and VDSL mode.

A third aspect of the invention provides a VDSL-type modem allowing top-down interoperability with ADSL modems and spin-offs thereof, namely in particular ADSL2 and ADSL2+, which will make it possible to install such a modem without having to bother with what type of modem it will communicate with.

An aspect provides an automatic configuration process for an xDSL modem operating in VDSL mode, the process comprising:

detecting a predetermined criterion corresponding to an asymmetric operating mode, in particular ADSL mode;

in response to said detection, switching off a number of carriers in order to establish an ADSL operating mode.

Thus, the XDSL modem can switch from a VDSL operating mode to an ADSL operating mode or one of its spin-offs, ADSL2, ADSL2+ etc.

Typically, the modem is a VDSL-type modem that operates with up to 4096 carriers and can be reconfigured in ADSL mode, with a reduced number of 256 carriers for operation in ADSL mode or ADSL2 mode or 512 carriers for operation in ADSL2+ mode.

Self-configuration is carried out after setting up of the procedure defined by recommendation G.994.1 of the ITU.

Alternatively, the optimal mode of configuration can be determined by detecting a criterion based on measurement of the line size.

Thus, an "all-technology"—symmetric and asymmetric— DSL modem is realized and the consumer can buy it and install it without worrying about which type of access— ADSL or VDSL—telecommunications operators provide. If a VDSL-type access is immediately available, the consumer will be able to use it immediately. If he/she has only ADSL-type access, then he/she will benefit from broadband access even for a distance shorter than 1.5 km. And whenever the telecommunications operator changes the subscriber's line to the VDSL technique, the consumer will then immediately benefit from it without altering his/her hardware.

Thus, the investment made by consumers, be it professionals or the general public, remains assured.

As regards operators, managing their stock of modems within their respective optical network units is easier, since they don't need to be concerned with the type of modem— ADSL or VDSL—used by their subscribers.

The circuit according to an aspect of the invention further provides a new dynamic function to control the communication mode of a dual-mode DSL modem—ADSL (and spin-offs thereof and VDSL.

In this manner, a consumer equipped with such a dual-mode DSL modem, will be able to choose between an ADSL or VDSL operating mode according to the desired type of services and rates. For example, to merely access the Internet, he/she may select the ADSL mode. On the other hand, to play or download a video, to play on-line or to open a high quality videoconference session, he/she would select the VDSL mode.

The modem according to one aspect of the invention provides a great flexibility for network broadband access and further offers telecommunications operators opportunities for new services.

A VDSL modem comprises a means for deactivating the cyclic suffix CS on the transmission path and a Power Spectral Density Shaping Filter (PSF) for conforming to an ADSL-type mask, associated with an Echo Suppression Filter (ESF) and a time-domain equalizer (TEQ) on the reception path.

Together, the PSF and ESF filters make it possible to operate either in VDSL mode or ADSL mode with the same line interface. Thus, signals can be correctly processed in ADSL mode while respecting the specific constraints of this mode. Thus, using the same basic electronics, which can be very easily integrated, one obtains the interoperability of a VDSL modem architecture on the one hand and, on the other hand, the possibility of controlling either manually or dynamically the transmission mode—ADSL or VDSL—of the modem.

Thus, within the electronics that realizes line interface, it is possible to guaranty compatibility regarding transmit spectral constraints.

Thus, a VDSL-type modem can be designed that allows operation in interoperability with the ADSL standard, therefore achieving interoperability in both operating modes.

An aspect of the invention also provides a new type of modem having an automatic self-configuring functionality.

BRIEF DESCRIPTION OF THE DRAWINGS

Other features and advantages of embodiments will appear when reading the following description and accompanying drawings, only given by way of nonrestrictive examples, where.

DETAILED DESCRIPTION

Embodiments of a Process for configuring an xDSL modem and xDSL modem having such a process are described herein. In the following description, numerous specific details are given to provide a thorough understanding of embodiments. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Hereinafter, a modem located in an optical network unit, at the telecommunications operator's end, will be designated as xTU-O (from "XDSL Transceiver Unit Office"), on the LT side (Line Termination). On the other hand, a modem that is located at the subscriber's end is indicated as XTU-R (from "XDSL Transceiver Unit Remote"), and is on the NT side (Network Termination).

Figure 1:
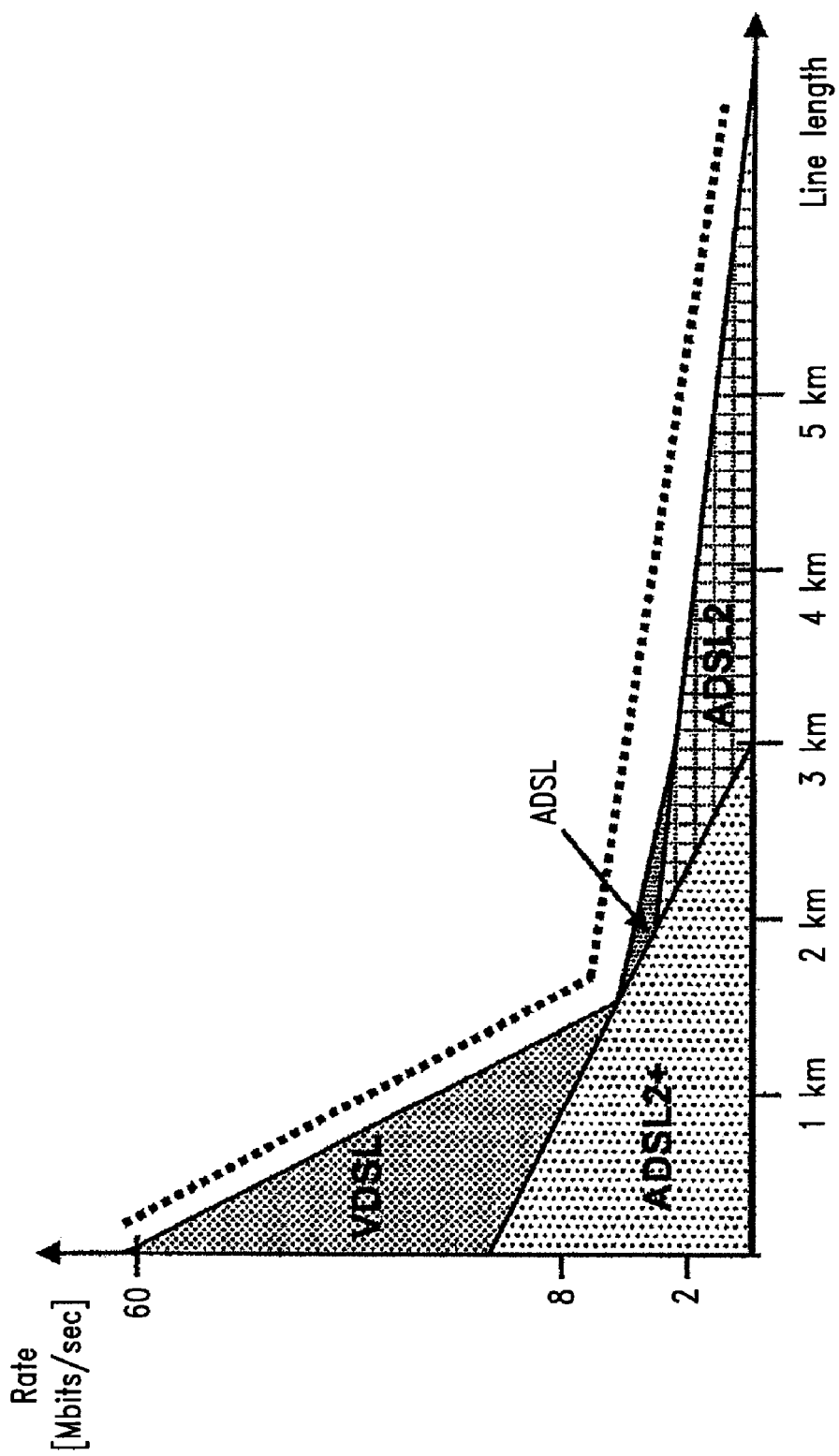
FIG. 1 illustrates the situation of various xDSL technologies and their performances according to the size of the line and the theoretical rate.
Figure 2:
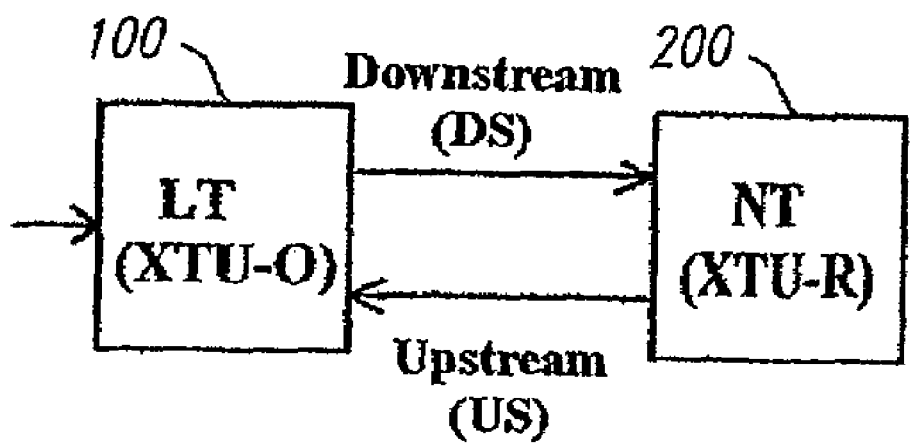
FIG. 2 illustrates the respective positions of an LT-type modem (i.e., modem located on the server or optical network unit) and a NT-type modem (i.e., the modem located on the subscriber's premises).

FIG. 2 illustrates the respective positions of an LT-type modem 100 and of a NT-type modem 200. The asymmetric nature of stream in ADSL mode implies that the stream from a LT modem to a NT modem—downstream or DS—is greater than the upstream or US Known ADSL modems comprise receive and transmit filters for separating the various frequency bands allocated to upstream and downstream. It is pointed out that in ADSL mode, carriers are regularly spaced out by 4.3125 kHz. Because of the characteristics of the line, the impulse response (IR) of the modulated signal transmitted on the copper twisted pair is spread; which results in generation of Inter Symbol Interference (ISI) that disrupts symbol reception.

It is then necessary to remove such inter symbol interference ISI.

In known ADSL technique, ISI is usually removed by means, on the one hand, of a cyclic prefix CP placed at the beginning of each symbol and, on the other hand, of a time-domain equalizer TEQ.

The cyclic prefix CP is used to absorb the maximum spreading out of the channel impulse response, which response is equal to the convolution product of the impulse response of the transmitter at one end of the line (noted $h_{tx}(t)$), the impulse response of the line itself (noted $h_{line}(t)$) and the impulse response of the receiver at other end of the line (noted $h_{rx}(t)$). Using the notation system used by people qualified in the art, the channel response is noted as $h_{channel}(t)=h_{tx}(t)*h_{line}(t)*h_{rx}(t)$.

In practice, the size of the cyclic prefix CP is set to a value $t_{max}$ such that $h_{channel}(t_{max}) \cong 0$. (eq. 1)

However, in ADSL mode, the lines used having a greater size (up to 5 km and more), impulse response $h_{channel}(t)$ is almost infinite; which, according to (eq. 1) would come to set an infinite value of CP or at least a value equal to the length of the symbols. Streams would then be virtually nil.

A way of compensating for this problem comprises using a time-domain equalizer (TEQ) for shortening impulse response $h_{channel}(t)$ in order to keep it within an interval CP having an acceptable length. In traditional ADSL mode, the value of CP is set to 40 samples at 2.208 MHz.

Time-domain equalization TEQ is known to people qualified in the art and usually comprises using a real digital filter whose coefficients are calculated during initialization of the modem.

Figure 8:
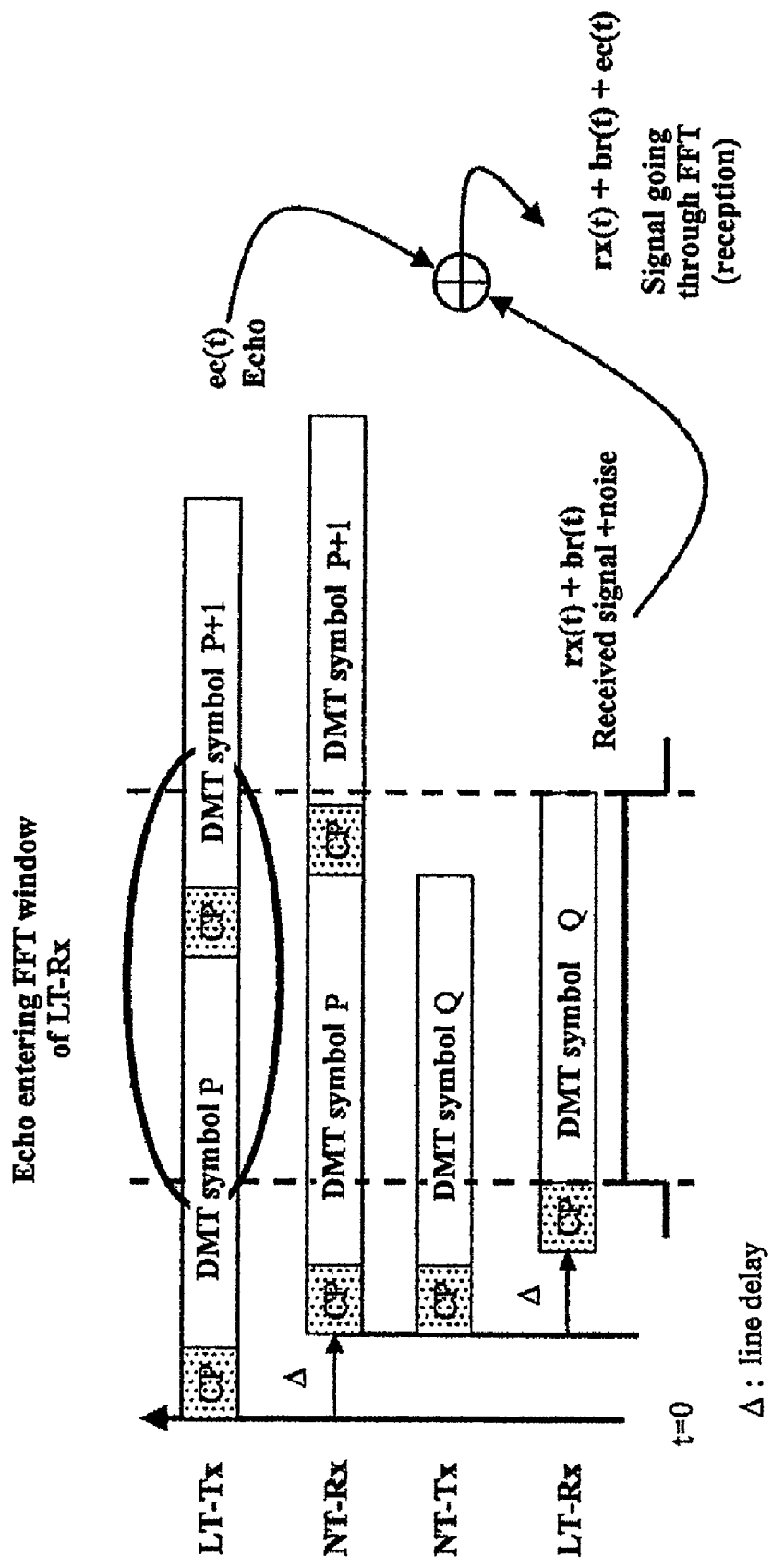
FIGS. 8, 9a and 9b illustrate the effect of the cyclic suffix (CS) used in VDSL mode.
Figure 9A:
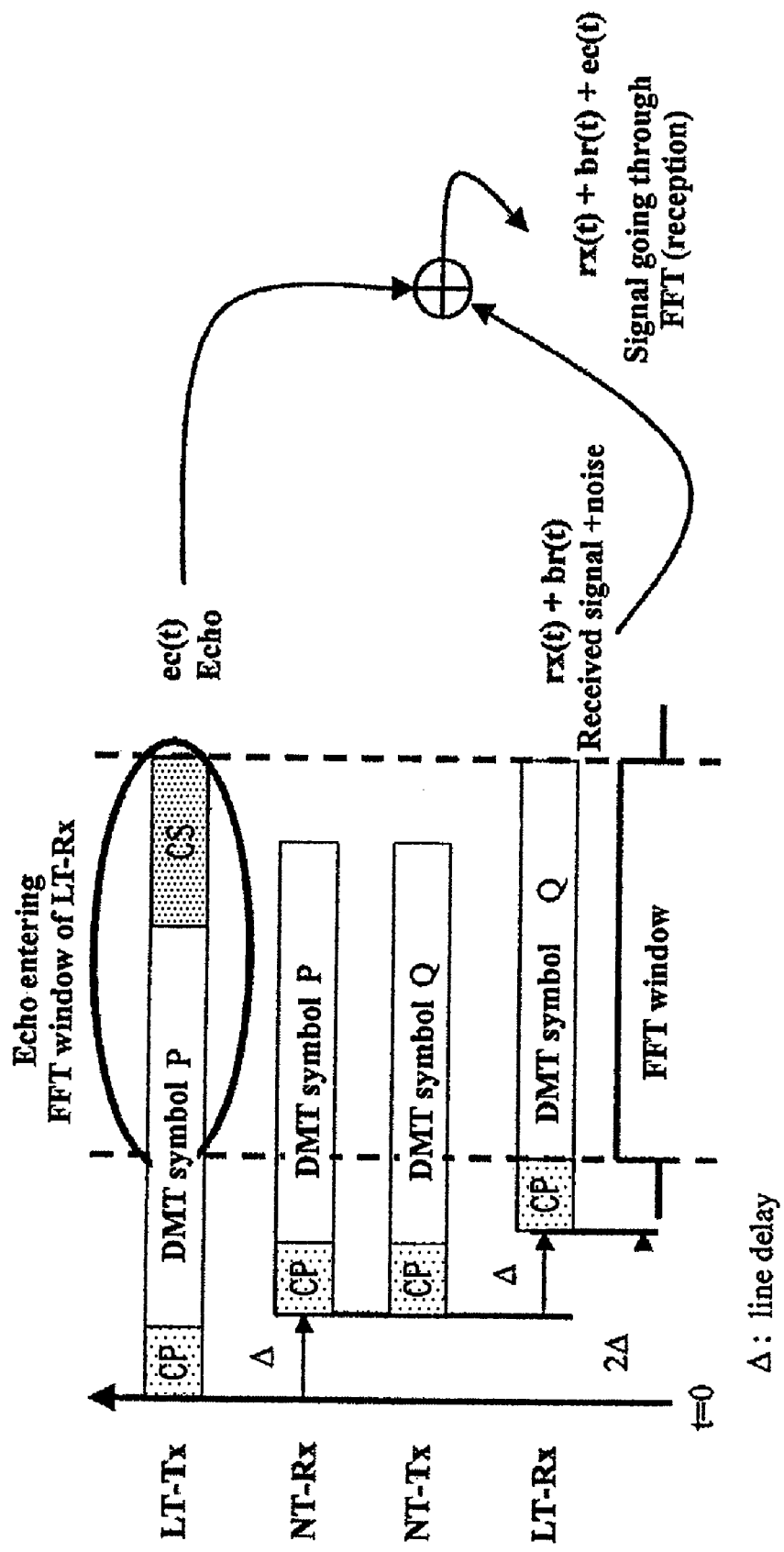
Figure 9B:
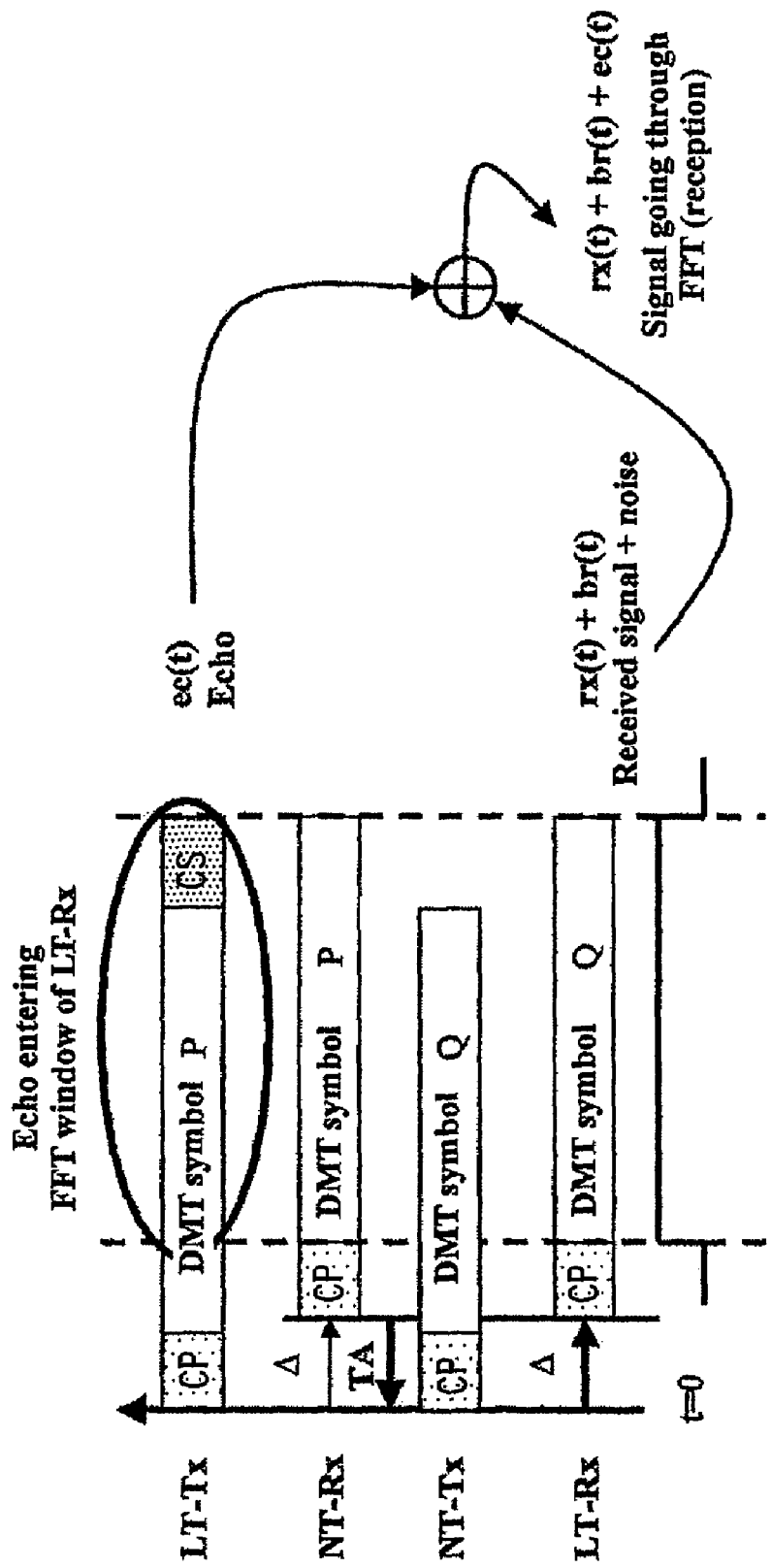
Figure 10:
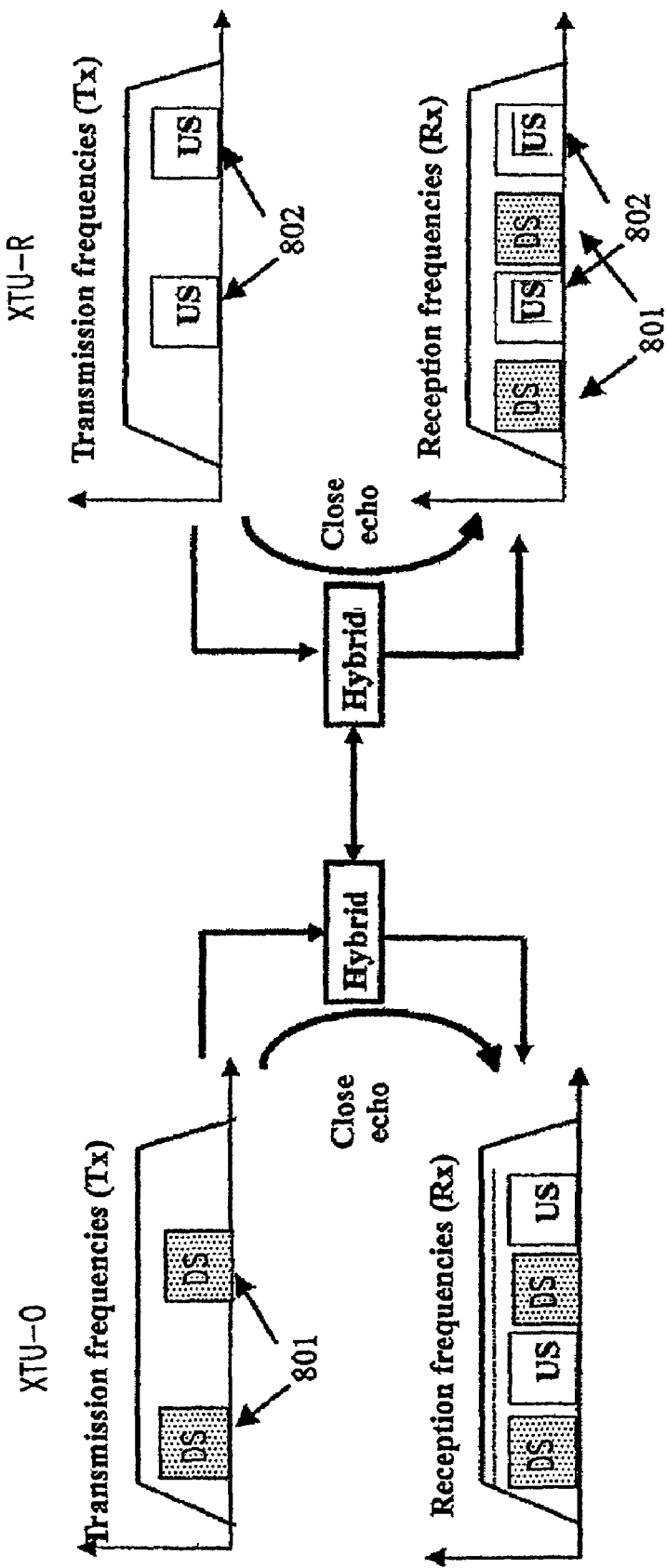
FIG. 10 illustrates the effect of the echo in the reception chain of a VDSL-type modem.

In traditional VDSL technique, as lines are shorter (<1.5 km), ISI can be removed by means of the cyclic prefix (CP) alone whose action is combined with that of a cyclic suffix CS, which makes it possible to preserve mutual perpendicularity between the received signal rx(t) and the signal from the echo ec(t) as shown in FIGS. 8 and 9a-9b. With this principle, it is thus possible to separate frequency bands allocated for upstream or downstream without adding any analog filters on line interface.

With ADSL technique, there is no cyclic suffix CS and upstream and downstream bands are separated by means of expensive analog filters that are inserted on line interface.

The circuit according to one embodiment of the invention makes it possible to be remove the need for analog filters and makes it possible for the same line interface to operate in VDSL mode or in ADSL mode.

To this end, a specific digital processing is incorporated into digital data processing of the signal, such digital processing being based on a PSD Shaping Filter in the transmission path and, on a digital Echo Suppression Filter (ESF) and a time-domain equalizer TEQ in the reception path.

Both filters are realized by means of a bandpass filter, composed of an elliptic third-order infinite impulse response (IIR) low-pass filter (LPF) and a sixth-order IIR high-pass filter (HPF).

Figure 3:
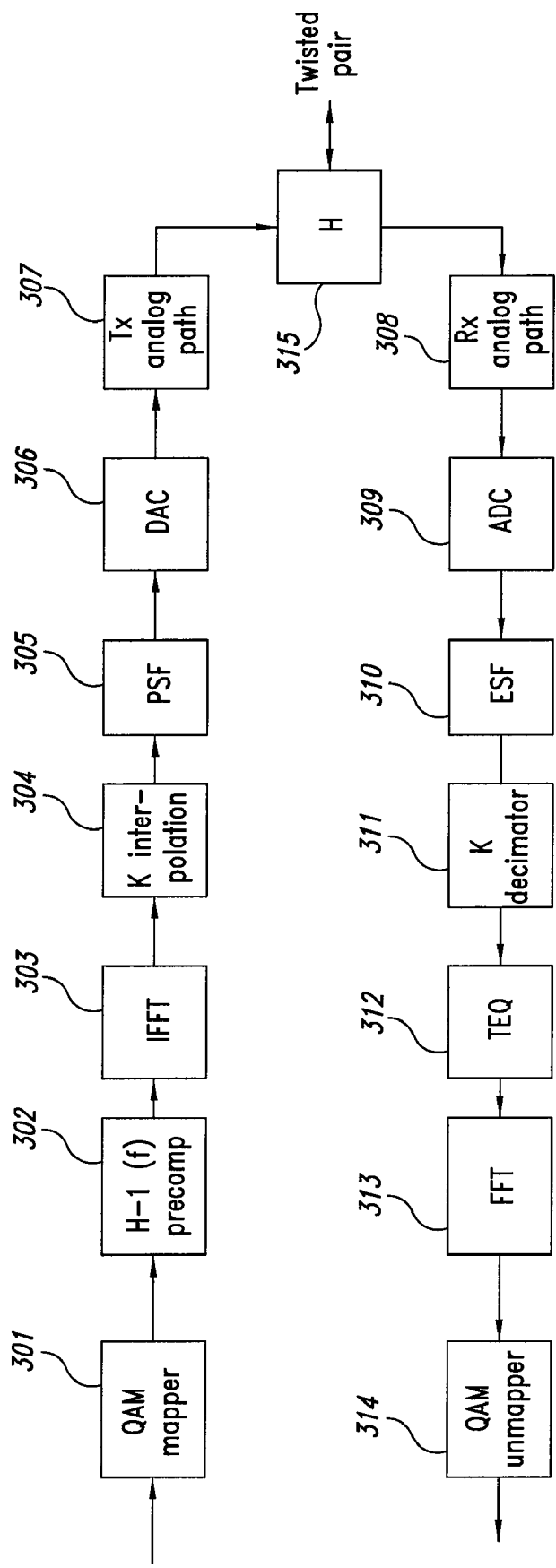
FIG. 3 illustrates a functional block diagram of the components of a VDSL modem interoperable in ADSL mode.

FIG. 3 illustrates a schematic diagram of a modem according to an embodiment of the present invention, operating in VDSL mode as well as in ADSL mode.

The transmit circuit is composed of a QAM mapper 301 establishing the correspondence between a symbol, M-area, to be transmitted and a point in a QAM constellation with $2^M$ states; it is followed by a precompensating filter H-1 which multiplies each incoming sample by the inverse function of the PSF filter, thereby correcting the distortion introduced by the PSF filter; an Inverse Fast Fourier Transform (IFFT) modulator 303 carrying out a DMT modulation (Discrete Multi-Tone modulation) for a variable number of complex points N, according to the chosen ADSL or VDSL mode; it is followed by an optional interpolator 304 (interpolation to K) for over-sampling the signal extracted from modulator 303. In VDSL mode, the inverse Fourier transform can include up to 4096 complex points. On the other hand, in ADSL mode, number N is set to 256 (for downstream) and, consequently, interpolator 304 interfaces the output of IFFT block 303 and the next block which is a PSF 305 shaping the signal so that it fits the PSD (Power Spectral Density) mask required in ADSL mode. The signal is then converted into analog form by a digital-to-analog converter DAC 306, then transmitted to a hybrid 315 via an analog path Tx 307 common to both ADSL and VDSL modes.

The receive circuit is dually composed of an analog path 308; then an analog-to-digital converter ADC 309; then a digital echo suppression filter (ESF) 310. A K-decimation block 311 for setting the sampling relationship between the conversion frequency of ADC 309 and the rate at which samples are input to a Fourier transform that is carried out by a FFT block 313 demodulating the signal after processing by a time-domain equalizer TEQ 312. An unmapper 314 then extracts symbols.

Surprisingly, one notes that thanks to the presence of PSF 305 and ESF 310, it is possible to do without the analog filter circuits traditionally found in an ADSL modem. Thus, it becomes possible to directly access main settings with a software and it is consequently possible to very simply control modem configuration in ADSL or VDSL mode according to a given criterion.

The general architecture of a dual-mode modem in accordance with one embodiment of the present invention will now be described in detail. Generally, in the embodiment, the modem is an ASIC-type integrated circuit including both VDSL and ADSL functions. Only the line interface, common to the ADSL and VDSL functions, is carried out outside the integrated circuit. It should be noted that hereinafter "VDSL" refers to the technique known as VDSL-DMT that corresponds to the most direct application of the concept of the invention. Indeed, as people qualified in the art will acknowledge, the VDSL-DMT shares the same modulation technique known as DMT (Discrete Multi-Tone) with the ADSL standard. In ADSL, a 1.104 MHz frequency band is divided into 256 carriers regularly spaced by a distance of 4.3125 KHz. In the VDSL-DMT approach, the number of carriers can be set to 4096, 2048, 1024, 512 or 256 and the standardized frequency band goes up to 12 MHz.

1. Architecture of an ADSL/VDSL Modem

Figure 6:
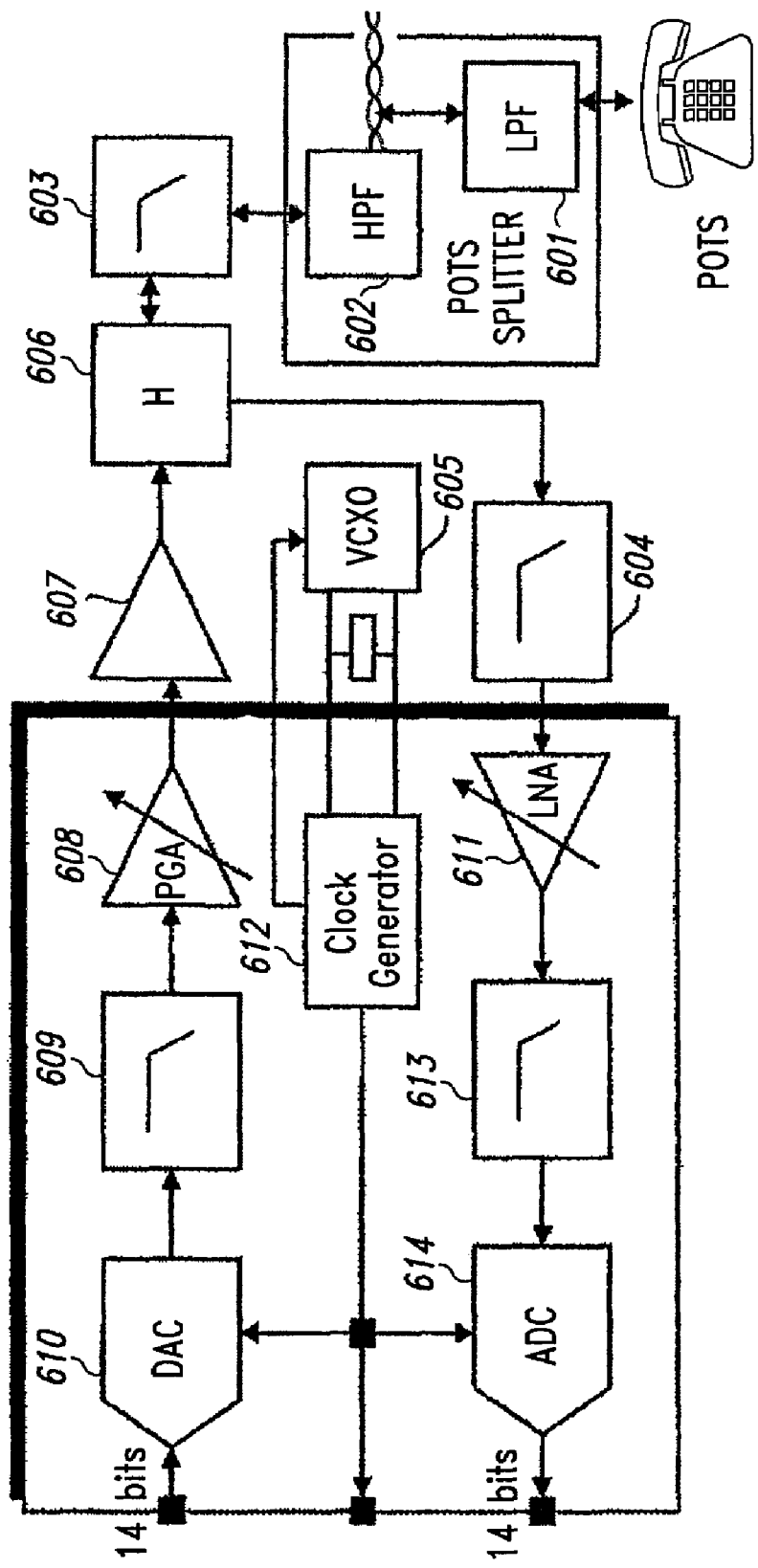
FIG. 6 details the line interface of an interoperable modem according to an embodiment of the present invention.

FIG. 6 more particularly illustrates the structure of a line interface of a dual-mode modem according to one embodiment of the invention. The line interface is comprised of a hybrid 606 for coupling the line, namely separating the upstream and downstream respectively received from a driver 607 and transmitted to a low-pass filter 604. Hybrid 606 is further connected to the twisted pair via a second low-pass filter 603 and a filter set—composed of a low-pass filter 601 and a high-pass filter 602—for splitting POTS and DSL services. This filter set is better known as "POTS Splitter" or "Splitter Service". Low-pass filters 604 and 603 cooperate together to form a high order low-pass filter and could be, according to cases, replaced by a single high-order low-pass filter. Generally, the design of splitter filters 601 and 602 is well known to people qualified in the art, therefore discussion of their realization will not be further developed.

On the receive path, low-pass filter 604 is connected to a low noise amplifier 611 (LNA), a low-pass filter 613 followed by an analog-to-digital converter (ADC) 614. The cut-off frequencies of filters 603, 604 and 613 are set to 12 MHz corresponding to VDSL bandwidth.

On the transmit path, a digital-to-analog converter (DAC) 610 generates an analog signal from digital samples—14 bit samples in an embodiment which signal is transmitted to a low-pass filter 609 then to a Programmable Gain Amplifier PGA 608. As the realization of low noise amplifier circuits and filter circuits is not the subject of this invention it will thus not be further developed.

The line interface circuit further comprises a clock generator circuit 612 and a voltage controlled oscillator 605, well known to people qualified in the art.

In general, driver 607 will be a discrete component located outside the integrated circuit of the modem. That is mainly due to the higher voltage required to interface with the telephone line. On the other hand, very often it will be possible to use only one driver 607, which will be appropriate for most operation situations in VDSL or ADSL mode, as will be seen later. Alternatively two drivers could be used, one for VDSL mode and the other for ADSL mode.

In one embodiment, a single driver 607—according to the VDSL mode specifications—is used to drive hybrid circuit 606. Indeed, as will be seen, all processing necessary to suitably process VDSL and ADSL signals can be realized by means of the architecture of FIG. 7.

It can be noted that the receive circuit comprises an optional echo suppression filter element ESF 701, similar to element 310 of FIG. 3. In VDSL mode, PSF and ESF filters are disabled.

As is well known, hybrid circuit 606 cannot be perfect and one notes that the echo returns back to the received signal and interferes with it. In VDSL mode, such echo is generally removed by means of a cyclic suffix combined with a timing advance mechanism that is well-known to people qualified in the art, such mechanism is illustrated in FIGS. 8 and 9a. In FIG. 8, in the LT modem located in the sub-distribution frame, the signal sampled by the FFT window is composed of the signal received on the LT-$R_x$ end and noted $r_x(t)$ comprising a DMT symbol Q, of noise br(t) and of echo signal $e_c(t)$ comprising in turn two pieces of consecutive DMT symbols P and P+1. On that spot, echo sampling creates inter symbol interference (ISI), which results in a loss of mutual perpendicularity between the received signal $r_x(t)$ and the echo $e_c(t)$. Such loss of mutual perpendicularity introduces a degradation of the signal/noise ratio at the splitting point between the upstream and downstream bands.

In FIG. 9a, it is shown that using a cyclic suffix CS added to the transmitted DMT symbol and comprising the first part of this symbol is enough to remove ISI since at the time of sampling by FFT window the signal is composed of a received DMT symbol Q and an echo DMT symbol P. In practice, the size of the cyclic suffix (CS) is set to twice the time (DELTA) needed by the signal to go from an end to the other (CS =2×DELTA). However, in order to reduce the size of CS a Timing Advance mechanism can be applied, as shown in FIG. 9b, which includes 1) measuring transmission time (DELTA) through the channel, 2) once the value of DELTA is determined, applying a DELTA timing advance to the signal emitted by the remote modem (i.e., the NT-Tx modem). In practice, this comes to shifting the time bases symbols of both modems by DELTA samples.

In VDSL mode, it is not necessary to use PSF and ESF filters. Indeed, on the transmit path, signal power spectral density shaping to the PSD masks is ensured by BETA parameter Tx Windowing (or Tx Pulse Shaping). Moreover, on the receive path, separation of the received signal and the echo is ensured by the application of the cyclic suffix and the previously mentioned Advance Timing mechanism. (In this operating mode, PSF and ESF filters are thus deactivated or disabled).

It is well known that in ADSL mode there is neither Tx windowing, cyclic suffix, nor timing advance mechanism. Indeed, in ADSL mode, these functions are deactivated. Then, traditionally, the echo is removed by means of an analog echo suppression filter located at line interface.

An embodiment of the present invention makes it possible to be freed from the traditional analog filter located inside line interface by means of a first ESF filter 701 used together with a PSF filter 723 that will be described below. Under certain conditions, PSF filter 723 could also replace ESF filter 701.

ESF filter 701 is a digital echo suppression filter. Generally, two infinite impulse response (IIR) filters are used to realize this ESF, respectively a first third-order High-pass Filter (HPF) and a second sixth-order Low-pass Filter (LPF) mounted in cascade.

Figure 7:
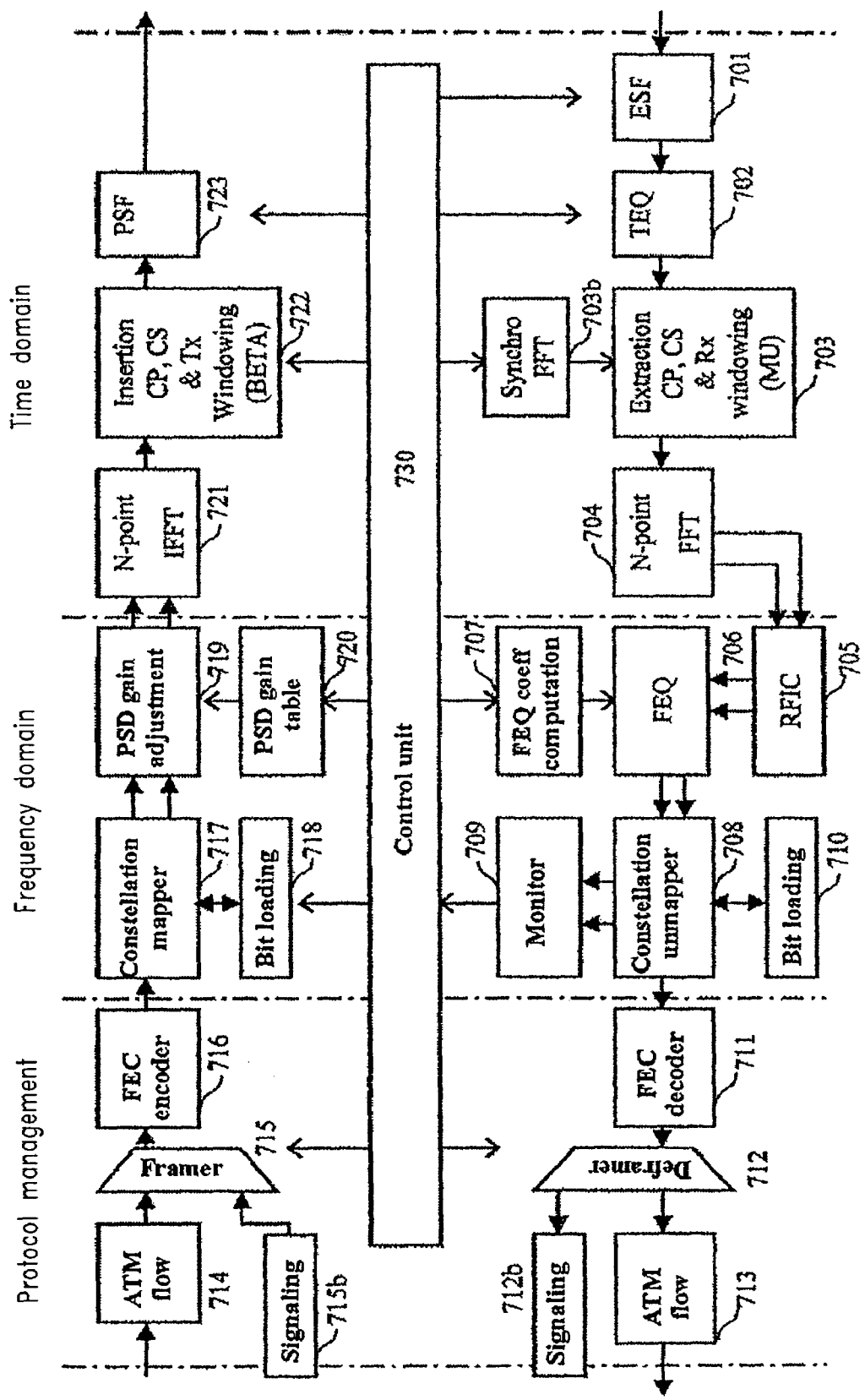
FIG. 7 illustrates an embodiment of the basic architecture of an interoperable modem according to the invention.

After processing by ESF filter 701, if necessary, digital samples are transmitted to a time-domain equalizer TEQ 702 (FIG. 7 clearly shows a separation between frequency domain and time domain). As previously, a decimator could be inserted between ESF filter 701 and equalizer 702 to convert samples resulting from FFT different sizes in ADSL and VDSL. It is pointed out that in VDSL mode the maximum number of points of the FFT is set to 4096 points while this number is 256 in the case of an ADSL connection.

TEQ equalizer block 702 is typically provided in the case of an ADSL modem. It is known that when a line is long, an almost infinite impulse response $h_{channel}(t)$ occurs, which does not make it possible to limit the resulting ISI only by means of a cyclic prefix. As was previously recalled, an added time-domain equalizer TEQ is then used in combination in order to shorten the $h_{channel}(t)$ response and confine it to the CP.

On the other hand, the known structure of a VDSL modem does not comprise any TEQ filter 702. This comes from the fact that lines are shorter and consequently inter symbol interference (ISI) can be entirely compensated by the cyclic prefix CP. In VDSL mode, block TEQ is thus disabled.

After equalization, the received signal is transmitted to a block 703 ensuring Rx synchronization of DMT symbols. To this end, synchronization is carried out, followed by parameter-MU Rx Windowing for shaping the signal. Synchronization, controlled by block 703b, is accomplished by capturing a synchronized "window" of 2N real samples (N being the number of carriers) in which CP and CS have previously been removed by block 703. LT-Rx diagrams of FIGS. 8 and 9a-9b show such a synchronization process. The 2N window samples are then shaped by the Rx Windowing function included in block 703. Parameter MU defining the windowing size is programmable. The resulting signal is then transmitted to the FFT. At this point, it should be noted that the FFT is a real-to-complex transform; which means that it generates N complex samples from 2N real samples input.

The values of CP and CS are adjusted according to, on the one hand, the type of operating mode, VDSL or ADSL (in which case CS =0) and, on the other hand, the value of N that is set according to the selected operating mode, namely 256 in the case of an ADSL downstream or up to 4096 in the case of a VDSL-type connection. The value of CP is set to 40 in ADSL mode.

A control unit 730—realized in software form in one embodiment-makes it possible to control the various setting parameters and hardware and software switches allowing the architecture to operate in both modes, and in particular:

The value of parameter N (determining the size of the window),

The value of parameters CP and CS,

The activation or the deactivation of PSF and ESF filters,

The activation or the deactivation of the TEQ filter,

The activation or the deactivation of the Tx Pulse Shaping function and the value of the BETA shaping parameter, The activation or the deactivation of the Rx Windowing function and the value of the MU shaping parameter.

The setting and switch control allows dynamic switching of the modem from one operating mode to the other.

The signal output from block 703 is then Fourier transformed for a number of N points, by a FFT block 704, ensuring demodulation of DMT signal (Discrete Multi-Tone). Block 703 is realized by means of a specialized electronic circuit allowing fast processing but the same function can be carried out by a suitably programmed digital signal processor (DSP).

A block 705—known as RFIC (Radio Frequency Interference Cancellation)—recovers the complex elements of the Fourier transform and removes any narrow band interference remainder in the frequency domain—in particular from radio hams—likely to cause interference in received signals, especially when operating in VDSL mode.

The elements are then transmitted to a Frequency-domain Equalizer (FEQ) block 706 that, if necessary, completes the equalization process previously carried out in the time domain by block 702. As known by people qualified in the art, equalization is carried out by measuring the distortion introduced by the channel on each considered carrier and by correcting such distortion. Equalization is digitally processed and the coefficients are provided by a coefficient calculation FEQ 707, controlled by a control unit 730.

After equalization in the frequency domain, signals are provided to a constellation unmapper 708 that takes the complex symbols received on each of the carriers. From each complex point, a constellation point is obtained according to the type of modulation used (4QAM or Quadrature Amplitude Modulation for example for a four-point constellation) and to bit loading provided by block 710.

The binary-coded data stream resulting from unmapping is then provided to a Forward Error Correction Decoder (FEC) 711 for decoding. ADSL mode allows an optional mode with lattice coding that will not be discussed here.

The decoded bits are then transmitted to a deframer 712 that extracts signal (block 712b) on the one hand, and on the other hand ATM cells (Asynchronous Transfer Mode) that can then be transmitted to the higher communication layer. Deframer 712 is directly related to the considered mode (ADSL or VDSL) and the adequate processing is consequently defined by software only.

Generally, signaling and protocol information used in processing ATM cells are well known to people qualified in the art and will consequently not be developed here.

Dually, in the transmission path, the ATM bit stream enters block 714 and is combined by means of a framer 715 with the signal information and protocol information provided by a block 715b. The result is then transmitted to a forward error correction encoder (FEC) 716 for inserting necessary protection on bits to be transmitted.

The stream of coded bits is then transmitted to a constellation encoder (or mapper) 717 that associates each M-area symbol (i.e., symbol of M bits) with a complex point in a constellation with $2^M$ states. The number of bits to be coded on each carrier is defined by block 718, which corresponds to block 710 contained in the reception path of the remote modem so that the extraction of bits can be suitably carried out after reception of the constellation point by the other modem. As is known to people qualified in the art, synchronizing the tables contained in blocks 710 and 718 of two opposite modems is done during an initialization phase, which will not be further discussed.

The constellation complex points are then transmitted to a PSD gain adjustment block 719 making it possible to apply a real gain to each carrier, which gain is defined by a PSD gain table 720. Contrary to the known approach, here a complex gain is considered so that a pre-compensation $H^{-1}(f)$ of the PSF transfer function 723 is introduced. Thus, a double function is fulfilled. On the one hand, the emitted signal fits the PSD authorized mask when operating in ADSL mode and on the other hand, the distortions introduced by PSF filter 723 are pre-compensated for. In this manner the nonlinear variations introduced by infinite impulse response PSF filter 723 are compensated for. Blocks 719 and 720 consequently realize the pre-compensation function of block 302 of FIG. 3. Pre-compensation coefficients $H^{-1}_{PSF}(k)$ are calculated for the PSF filter considered. They are then incorporated into table 720 that becomes complex in the following way: each new gain coefficient $G'_{PSD}PSD(k)$ is equal to the value of the initial PSD gain of $G_{PSD}(k)$ multiplied by the pre-compensation coefficient $H^{-1}_{PSF}(k)$ i.e., $G'_{PSD}(k)=G_{PSD}(k) \times H^{-1}_{PSF}(k)$.

After processing by PSD block 719, a time-domain signal is generated by means of an inverse Fourier transform 721 receiving N complex points on its input and providing 2N real samples on its output, N being defined according to the desired operating mode. In ADSL mode, like for block 704, N will be chosen equal to 256. As a consequence block 721 generates signal DMT in time-domain. Like previously, if necessary an interpolator (not shown in the figure) can be inserted to take into account the sampling ratio resulting from the ratio of FFT sizes that are distinct for ADSL and VDSL.

The time-domain signal is then transmitted to block 722 that introduces cyclic prefixes and suffixes CP and CS according to the operating mode considered, and Tx Pulse Shaping with a BETA parameter that is defined in accordance with the standard considered.

Figure 11:
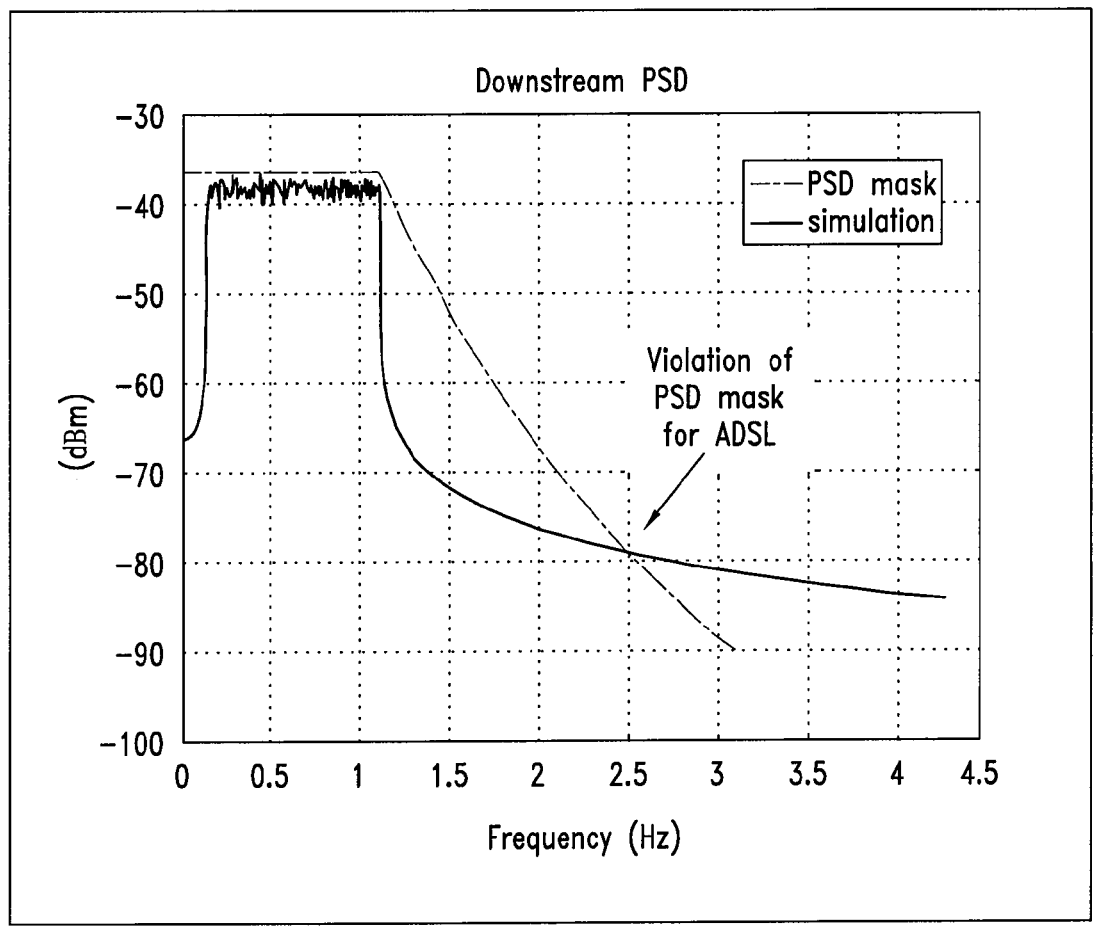
FIGS. 11 and 12 illustrate the effect the PSF filter for conforming with the PSD mask specific to ADSL technology.
Figure 12:
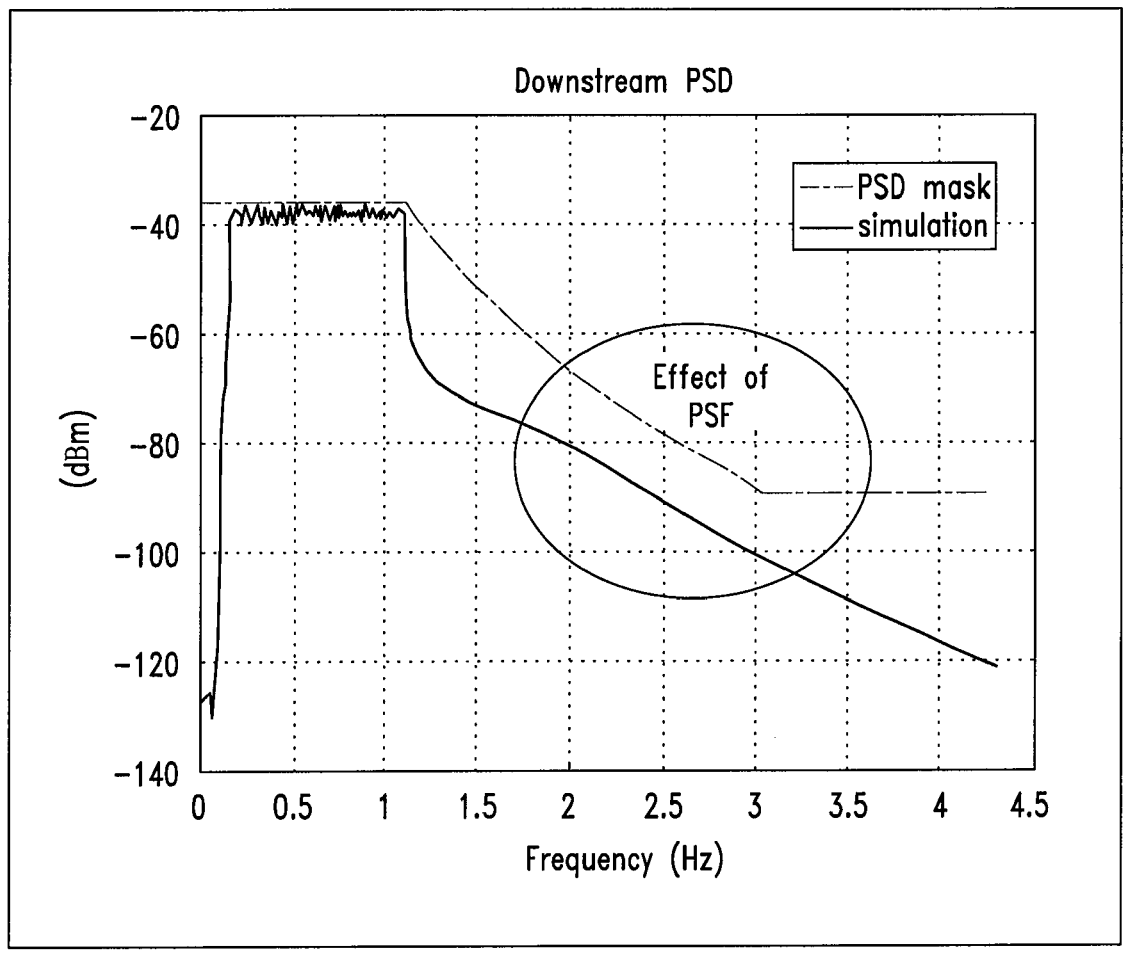

PSD shaping filter block 723 (PSF) is then used for shaping signals in order to comply with PSD masks. Generally, two Infinite Impulse Response (IIR) filters are used to realize this PSF, respectively a first third-order high-pass Filter (HPF) and a second sixth-order low-pass filter (LPF). FIG. 11 and 12 illustrate the effect of PSF filter 723 on the transmission signal compared to a PSD mask in ADSL. It was noted that when PSF filter 723 is sufficiently strong—which IIR filters are—one can even do without ESF filter 701.

The diagram of FIG. 7 is also complemented by a monitor circuit 709 that carries out some processing on the received signal, and in particular calculates distortion and noise variance on each carrier, etc. Such calculations are well known to people qualified in the art and will not be further discussed here.

As seen previously, the architecture that has been just described makes it possible to operate in ADSL mode as well as in VDSL mode. In particular, it could be advantageous to employ only one line interface circuit. As a result, downward interoperability from a VDSL modem to an ADSL modem is obtained, which contrasts sharply with the traditional doctrine that consists in opposing both techniques.

On the contrary, not only are these two techniques not opposite but they now appear complementary since it will be possible to dynamically switch from ADSL operation towards VDSL operation.

The architecture that has been described makes it possible to comply with the constraints imposed by VDSL as well as ADSL. More particularly, it makes it possible to realize automatic modem configuration in an operating mode, either ADSL or VDSL.

2. Configurations of a ADSL/VDSL Modem

As seen previously, the discussed architecture makes it possible to provide an ADSL/VDSL interoperability function in an entirely automatic way.

More generally, the architecture that has just been described makes it possible to dynamically control switching between a symmetric and asymmetric mode according to a predetermined criterion.

Two particular criteria will now be described as an illustrative example, of course, people qualified in the art could readily adapt the structure to any other unspecified criterion.

Determination of the Operating Mode by the G.HS Procedure

In a first criterion, the modem uses universal protocol G.HS, specified in recommendation G.994.1 of the International Telecommunications Union (ITU) that allows, via the exchange of signals and messages, two unspecified xDSL modems to mutually activate each other and to determine in which mode they will dialogue. The result of the G.HS protocol is the identification of the operating mode: ADSL or VDSL.

As of power-on, a dual-mode modem in accordance with the present invention is in a state known as "suspend state" where it waits to be activated in ADSL mode or VDSL mode.

In this state, it tries to detect activation signals by relying, in this first embodiment, on signal sets A43, B43, C43 and D43 (signal set for VDSL but not yet fixed) of G.HS protocol.

Universal protocol G.HS specified in recommendation G.994.1 of the ITU allows, via the exchange of signals and messages, two xDSL modems to mutually activate each other and to determine in which mode they will communicate. In the known approach, procedure G.994.1 is used to allow a modem to make sure that the modem at the other end complies with its own standard. In the event of nonconformity, the communication stops. The dual-mode modem in accordance with the present invention uses the existing protocol to determine which operating mode to use and initiate the adequate start sequence.

Figure 4:
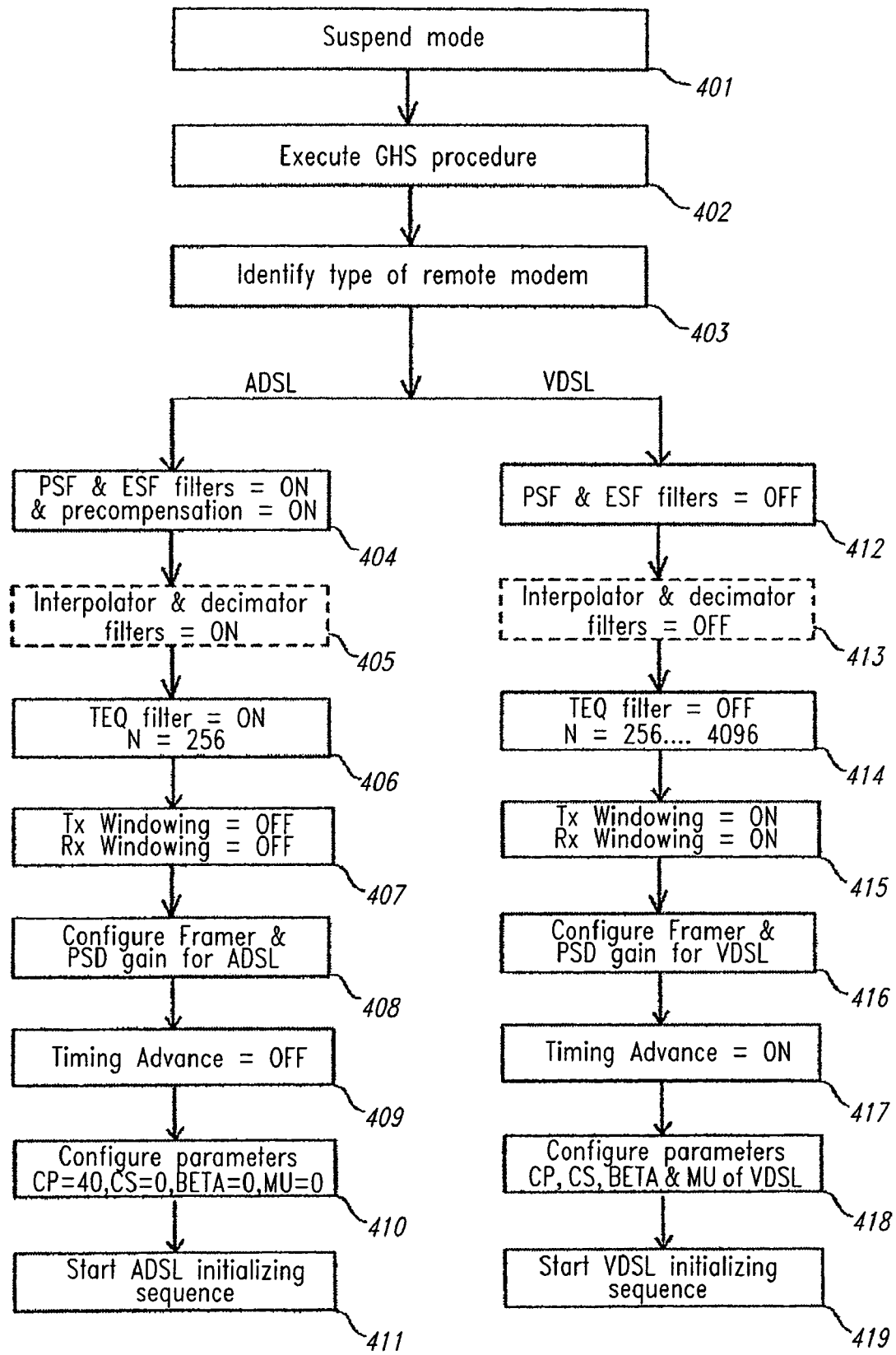
FIG. 4 illustrates a first automatic configuration mode of an interoperable modem according to the invention.

The result of G.HS is the identification of the operating mode: ADSL or VDSL, and is used as an automatic configuration criterion that will now be described in reference to FIG. 4.

In step 401, AN modem enters suspend state.

In step 402, the process carries out procedure G.994.1 (G.HS) and awaits identification signals sent back from the distant modem.

In step 403, the process identifies the type of the distant modem that is connected to the other end of the line.

If the modem is recognized as being an ADSL-type, then the process continues with step 404 where it enters self-configuration of its architecture into an ADSL-type modem, by running the sequence of parameter configuration steps 404-411.

In step 404, the process activates PSF filter 723 and ESF filter 701.

In step 405, if necessary, the decimator (resp. interpolator) is configured to do the adequate sampling ratio between the output of ADC converter (resp. input of DAC converter) and the input of the FFT (resp. output of the IFFT)

In step 406, time-domain equalizer TEQ 702 and frequency equalizer 706 are enabled and the number of carriers (in DS band) is set to 256. Consequently, the other carriers used in VDSL mode are deactivated.

Tx windowing parameters and Rx windowing parameters are deactivated in step 407. In step 408, framer 715 and gain block 719 are configured in ADSL mode.

Time-domain advance is deactivated in step 409.

In step 410, cyclic parameters CP and CS are set to 40 and 0 respectively. Parameters BETA and MU are set to 0.

The modem then continues with step 411 during which it initiates the ADSL initialization sequence, well known to people qualified in the art.

In this state, the architecture of the modem is configured to split the various channels by means of digital PSF and ESF filters respectively, contrary to known ADSL modems that usually use analog filters in line interface.

On the contrary, if signal detection by the G.HS protocol shows that the remote modem is VDSL, the dual-mode modem also configures itself in VDSL mode.

To this end, the process continues with step 412 in which PSF filter 723 and ESF filter 701 are deactivated.

In step 413, the decimator (resp. interpolator) is also configured in order to respect the sampling ratio between the output of ADC converter (resp. DAC converter) and the input of the FFT (resp. output of the IFFT).

The process then continues with step 414 where TEQ is also deactivated and the number of carriers is set to a number compatible with VDSL mode, for example 4096 carriers.

In step 415, the process activates Tx windowing and Rx windowing with the default BETA and MU parameters, respectively.

Then, in step 416, framer 712 and gain block 719 are configured in VDSL mode.

Advance timing is activated in step 417 with a default value.

In step 418, parameters CP, CS, BETA and MU are respectively set to values corresponding to the VDSL mode.

The modem continues finally with step 419 that is the VDSL initialization sequence making it possible for the modem to then operate in this mode.

Determination of the Operating Mode by Measurement of the Size of the Line

Figure 5:
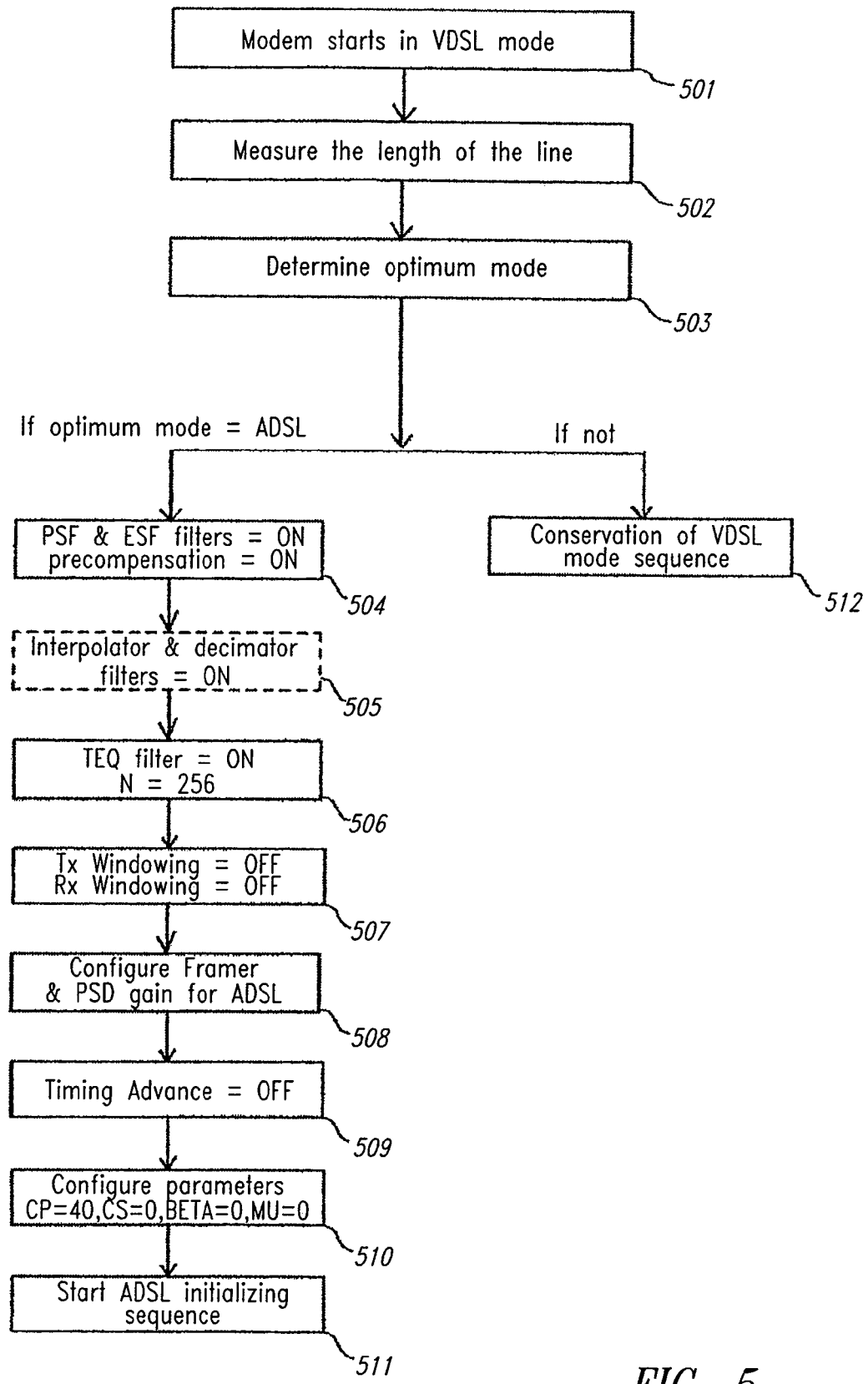
FIG. 5 illustrates a second automatic configuration mode of an interoperable modem according to an embodiment of the invention.

A second criterion of switching of the operating mode—ADSL or VDSL—of an AN modem is now described. FIG. 5 illustrates a second embodiment making it possible to adapt the operating mode according to the size of the line.

The process starts at step 501 where the modem starts, for instance, in VDSL mode, generally after powering up of the modem. Configuration in VDSL mode results from the execution of the complete initialization sequence of the VDSL modem or a shortened sequence not described here.

In step 502, the process measures the size of the line. The determination of the line size is carried out by calculating the time for the signal to go from one modem to the other and back. In an embodiment, one uses the method known in VDSL for measuring timing advance, which parameter is used to insert a time base shift in both modems in order to reduce the cyclic suffix to a mere value of Delta (and not 2×Delta). Clearly, this is a specific embodiment and people qualified in the art will be able to substitute any other known method or process to measure the size of the line.

In one embodiment, line size measurement makes it possible to decide for the optimum operation mode of the modem.

In step 503, the process uses a decision mechanism based on the previous determination, to choose the adequate operating mode.

In the case of a long line, step 503 will lead to choosing an ADSL-type operating mode, with disabling of a certain number of carriers.

The process then proceeds with the execution of a sequence of steps 504-511—similar to steps 404-411—ending with the sequence for initializing the modem in ADSL mode.

On the contrary, if the line is regarded as compatible with the VDSL operating mode, then the modem remains in its initial VDSL mode. If necessary, it can again run the complete VDSL initialization sequence, in order to optimize communication parameters.

The embodiments that have just been presented illustrate perfectly the great flexibility allowed by the architecture of FIG. 3 and 7. With the invention, the modem may start in one particular default mode—either VDSL or ADSL and switch to the appropriate one in accordance with one predefined criterium. It is can be noted that any criterion could be taken into account to cause, in an entirely automatic way, switching between a symmetric or asymmetric mode. To this end, an example of mode switching according to the size of the line was shown previously. Additionally, the measure of the signal to noise ratio per carrier is another example of criterium which may be used.

Thus, it is possible to merge two technologies that are traditionally seen as distinct and opposed: VDSL technology, for broadband applications rather intended for professional or privileged customers, and ADSL technology for the general public. With the circuit according to the invention, by means of a single modem architecture, a duality allowing the greatest flexibility is achieved.

Thus, modem manufacturers will be able to offer to their clients the option to choose the new VDSL technology modems while ensuring they will operate in areas where only ADSL access is available.

For their part consumers will find a direct advantage in buying hardware that will guaranty immediate operation with ADSL networks while allowing later access to the new standard.

Thus, it can be noted that with such an arrangement, a VDSL-type modem can operate in ADSL mode while maintaining the same line interface.

This results in considerable advantages regarding ease of integration and production cost.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The above description of illustrated embodiments, including what is described in the Abstract, is not intended to be exhaustive or to limit the invention to the precise forms disclosed. While specific embodiments and examples are described herein for illustrative purposes, various equivalent modifications are possible within the scope of the invention and can be made without deviating from the spirit and scope of the invention.

These and other modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A process for configuring a symmetric xDSL-type modem, comprising:
    detecting a criterion corresponding to an asymmetric operating mode of said modem of an ADSL-type; wherein detecting such criterion includes obtaining an estimation of a length of a line by measuring transmission time between said modem and another modem through said line; and
    in response to said detection, disabling a number of carriers in order to establish the asymmetric operating mode of said modem.

2. The configuration process according to claim 1 wherein said process is applied to said modem, which is a VDSL-type modem operating with up to 4096 carriers and being reconfigurable in ADSL mode with a number of carriers reduced to 256.

3. The configuration process according to claim 1 wherein said detection of said criterion further includes a detection of signals defined in recommendation G.994.1 or a measurement of the signal to noise ratio per carrier.

4. The configuration process according to claim 1 wherein said estimation of the line length by measuring transmission time through said line is derived from a calculation of time for a signal to go from said modem to said another modem and back using a timing advance measurement.

5. The configuration process according to claim 1, further comprising deactivating a cyclic suffix in a transmit path and digital power spectral density shaping filtering for conformity to an ADSL-type mask, associated with a digital echo suppression filter and a temporal equalizer in a receive path.

6. The configuration process according to claim 2 wherein in ADSL mode, the configuration process comprises:
    in a transmit path:
        activating a digital power spectral density shaping filter (PSF) for conformity with an ADSL-type mask;
        deactivating a process for inserting a cyclic suffix after each symbol to be transmitted;
        activating a $H^{-1}(f)$ pre-compensation before an inverse Fourier transform allowing to compensate for a phase and amplitude distortion introduced by said digital PSF; and
    in a receive path, activating a digital echo suppression filter and temporal equalizer.

7. The method of claim 1 wherein said detection enables top-down interoperability between said asymmetric operating mode of said modem and a symmetric operating mode of said modem.

8. An xDSL-type modem allowing symmetric operation in DMT mode based on a number of carriers, the modem comprising:
    means for detecting a criterion for operation in an asymmetric mode of an ADSL-type mode, wherein said means for detecting such criterion includes means for obtaining an estimation of a length of a line by measuring transmission time between said modem and another modem through said line; and
    means for controlling, based on said detection of said criterion, disablement of a number of carriers in order to establish the asymmetric operating mode.

9. The modem according to claim 8, further comprising means for communicating in VDSL mode and means for self-configuring in ADSL mode in response to detection of said criterion.

10. The modem according to claim 8 wherein said detection of said criterion includes a detection of signals defined in recommendation G.994.1 or a measurement of signal to noise ratio per carrier.

11. The modem according to claim 8 wherein said estimation of the line length by measuring transmission time through said line is derived from a calculation of time for a signal to go from said modem to said another modem and back using a timing advance measurement.

12. The modem according to claim 8 wherein in ADSL mode, the modem comprises:
    in a transmit path:
        a digital power spectral density shaping filter (PSF) that can be disabled, for conformity to an ADSL-type mask;
        means for pre-compensating phase and amplitude distortion introduced by said digital PSF filter;
        means for deactivating insertion of a cyclic suffix after each symbol to be transmitted;
    in a receive path:
        a digital echo suppression filter (ESF) combined with a digital time-domain equalizer.

13. The modem according to claim 12 wherein said power spectral density shaping filter (PSF) and echo suppression filter (ESF) are infinite impulse response low-pass filters.

14. The modem according to claim 12 wherein said PSF and ESF filters are identical.

15. The modem according to claim 12, further comprising in the transmit path, a complex gain element before modulation, in order to pre-compensate for distortion introduced by said PSF and ESF filters.

16. The modem according to claim 8 wherein switching from ADSL mode to VDSL mode is accomplished in response to user control.

17. The modem of claim 8 wherein said means for controlling enables top-down interoperability between said asymmetric operating mode and said symmetric operation.

18. A method, comprising:
configuring a modem for interoperability between first and second xDSL operating modes;
detecting a criterion associated with the first operating mode, wherein detecting such criterion includes obtaining an estimation of a length of a line by measuring transmission time between said modem and another modem through said line; and
in response to the detected criterion, disabling a number of carriers associated with the second operating mode to establish the first operating mode.

19. The method of claim 18 wherein said estimation of the line length by measuring transmission time through said line is derived from a calculation of time for a signal to go from said modem to said another modem and back using a timing advance measurement.

20. The method of claim 18 wherein said detecting the criterion includes detecting signals associated with the first operating mode.

21. The method of claim 18 wherein said disabling the number of carriers associated with the second operating mode to establish the first operating mode includes disabling a number of carriers associated with a VDSL-type operating mode to establish an ADSL-type operating mode.

22. The method of claim 18, further comprising:
deactivating a cyclic suffix for a transmit path; and
digital signal processing based on a power spectral density shaping filter for the transmit path and based on a digital echo suppression filter and a temporal equalizer for a receive path.

23. An apparatus, comprising:
a modem to interoperate between first and second xDSL modes;
a first component of the modem to detect a criterion associated with the first mode, wherein detection of such criterion includes an estimation of a length of a line by measurement of transmission time between said modem and another modem through said line; and
a second component of the modem to disable a number of carriers associated with the second mode to establish the first mode, in response to the criterion detected by the first component.

24. The apparatus of claim 23 wherein said estimation of the line length by measurement of transmission time through said line is derived from a calculation of time for a signal to go from said modem to said another modem and back using a timing advance measurement.

25. The apparatus of claim 23 wherein the first component to detect the criterion is adapted to detect at least one signal associated with the first operating mode.

26. The apparatus of claim 23 wherein the first mode comprises an ADSL-type operating mode, and wherein the second mode comprises a VDSL-type operating mode.

27. The apparatus of claim 23, further comprising:
a digital power spectral density shaping filter;
a pre-compensation unit coupled to the digital power spectral density shaping filter to pre-compensate phase and amplitude distortion introduced by the digital power spectral density shaping filter;
a deactivation unit to deactivate insertion of a cyclic suffix after each symbol to be transmitted; and
a digital echo suppression filter coupled to a digital time-domain equalizer.

28. The apparatus of claim 27 wherein the digital power spectral density shaping filter and echo suppression filter comprise infinite impulse response filters.

29. The apparatus of claim 27, further comprising a complex gain element before modulation to pre-compensate for distortion introduced by the digital power spectral density shaping filter and the digital echo suppression filter.

30. The apparatus of claim 23, further comprising:
a means for signal processing along a transmit path of the modem;
a means for signal processing along a receive path of the modem; and
a means for controlling switching operation between the first and second modes.

* * * * *

UNITED STATES PATENT AND TRADEMARK OFFICE
CERTIFICATE OF CORRECTION

PATENT NO. : 7,519,109 B2  Page 1 of 1
APPLICATION NO. : 10/813991
DATED : April 14, 2009
INVENTOR(S) : Christophe Del Toso et al.

It is certified that error appears in the above-identified patent and that said Letters Patent is hereby corrected as shown below:

Column 13
Line 61, "4096carriers" should read as --4096 carriers--

Line 67, "of the signal to noise ratio per camer." should read as --of the signal to noise ratio per carrier.--

Signed and Sealed this

Third Day of November, 2009

David J. Kappos
*Director of the United States Patent and Trademark Office*